United States Patent Office 3,339,546
Patented Sept. 5, 1967

3,339,546
BANDAGE FOR ADHERING TO MOIST
SURFACES
James Ling Chen, Milltown, N.J., assignor, by mesne
assignments, to E. R. Squibb & Sons, Inc., New York,
N.Y., a corporation of Delaware
No Drawing. Filed Dec. 13, 1963, Ser. No. 330,271
8 Claims. (Cl. 128—156)

This invention relates to and has as its object the provision of novel bandages. More particularly, this invention relates to bandages which may be applied to moist body surfaces and remains adhered thereto over extended periods of time.

Heretofore, there has not been available to dentists, dental surgeons, dermatologists and other like practitioners of the medical art any bandages which could be used locally on body surfaces both internal and external, either moist or dry, over extended periods of time. Attempts to employ special tape or other like bandages on moist body surfaces especially, have universally met with failure. The moisture encountered upon application prevents adherence of the tape. Attempts to overcome these shortcomings by the use of ointments or other like substances have likewise met with failure, due to the fact that the moisture present shortly causes the ointments and other like substances to be washed away.

It has now been found possible to prepare a novel bandage which instantaneously will adhere to body surfaces and preferably on moist body surfaces and most preferably on internal moist surfaces of the oral cavity. These novel bandages are soft, pliable, and easy to apply, and when applied, conform to the curvature of the surface upon which they are applied, and especially in the case of application to the internal surface of the oral cavity. The bandage of this invention has no odor or taste, and once it is applied to the surface to be treated, it will not of itself peel off, chip off and fall off, but slowly wear off over an extended period of time. The novel bandage of this invention will remain in position through all activities of the person being treated, for example, during drinking, eating, sleeping, speaking, chewing or biting, without any signs of irritation or toxicity.

In addition to its unique adhering properties, the novel bandages of this invention have been found to promote the healing of the areas treated therewith. The use of the novel bandages of this invention have been found to reduce the time for healing from days to hours in some cases of intra-oral use.

This invention has as an objective the provision of new and novel bandages which may be applied on body surfaces, either moist or dry, and which will adhere thereto over extended periods of time.

Another objective of this invention is the provision of a bandage which may be employed to retain a medicament on the body surface being treated.

Still another objective of this invention is a new and novel method for the sustained therapeutic treatment of body surfaces with medicaments.

Yet another object of this invention is the provision of a novel bandage which can be applied to moist body surfaces and will adhere thereto over extended periods of time.

Even another objective of this invention is the provision of a novel bandage which will promote the healing of the wounded area to which the bandage is applied.

Other objectives of this invention will become apparent from a further reading of the following description of the invention.

It has now been found that new and novel bandages exceedingly suitable for application on moist body surfaces, for example, on intra-oral surfaces may be prepared from certain known materials not heretofore employed for such purposes. Essentially, the novel bandages of this invention comprise a unique adhesive bonding composition.

The bonding compositions which may be employed in the practice of this invention are those which have been found, either alone or in combination with other like compositions, to adhere to body surfaces. The adhesive bonding compositions of this invention comprise a water soluble or swellable hydrocolloid or mixtures thereof, such as polyvinylalcohol, powdered pectin, gelatin, carboxymethylcellulose, high molecular weight carbowax, carboxypolymethylene and other like substances, which hydrocolloids or mixtures thereof are incorporated in a natural or synthetic viscous gum-like substance such as natural rubber, silicone rubber, acrylonitrile rubber, polyurethane rubber, polyisobutylene, sucrose acetate isobutylate and other like substances. The viscous gum-like substance acts as a binder for the hydrocolloid particles and, in addition, renders the final bonding composition elastic and pliable. Most preferably, it has been found that the use of polyisobutylene, having incorporated therein a powdered mixture of pectin, gelatin, and carboxymethylcellulose, gives most satisfactory results.

When the natural or synthetic viscous gum-like substances are employed in the practice of this invention, it may be desirable to employ plasticizers or solvents, such as mineral oil or petrolatum in combination therewith, to improve adherence characteristics and/or to provide the desired consistency.

In addition to the use of the bonding compositions of this invention by themselves, it has been found that very satisfactory results are obtained when a thin pliable water insoluble film has secured to one side thereof a substantial amount of the unique adhesive bonding compositions of this invention. The water insoluble films which may be employed in the practice of this invention include inter alia films prepared from such materials as polyethylene polymers and copolymers of vinylidene chloride (Saran, Dow) fluorohalocarbon film (Aclar, Allied Chemical) condensation product of ethylene glycol and terephthalic acid (Mylar, Dupont) polypropylene film, polyamide films (Capran, Allied Chemical) and other like water impervious films. Most preferably, it is desired to employ a polyethylene film in the practice of this invention, although the other water insoluble films also give satisfactory results.

In the practice of this invention, medicaments may be applied and retained on the affected areas on the body surfaces to be treated by the employment of the novel bandages of this invention. For these purposes, the medicament may be applied on the surface of the bandage that will come in contact with the affected area to be treated or may be incorporated in the bonding composition of the bandage. The medicament may be applied to the surface of the bandage as by dusting, spraying or spreading. Among the medicaments which may be employed are included such substances as insulin, antibiotics, for example, amphotericin, tetracycline; anesthetic, such as benzocaine; anti-inflammatories, such as triamcinolone acetonide.

The water insoluble film which may be employed in the practice of this invention may have a thickness of from 0.0005 inch to 0.05 inch and most preferably from 0.0005 to 0.002 inch. The adhesive bonding composition which is applied to one surface of the film is in sufficient amount to give a complete coverage of the wounded area to be treated. It has also been found that it is possible to apply a water impervious film to the novel bandages of this invention after they have been placed on the surface being treated.

The following examples are illustrative of the invention:

*Example 1*

Fifty-eight grams of polyisobutylene are heated to 70–80° C. Forty-two grams of a mixture of pectin, gelatin, and sodium carboxymethylcellulose is then mixed in with the heated polyisobutylene and the mixture allowed to cool, thereby forming a dough-like substance. This dough-like substance is passed through a roller mill to make the mixture more uniform, and the dough is then flattened in a hydraulic press to the desired thickness. A sheet of thin gauge polyethylene film is then pressed over one side and the resultant mat is cut into strips, squares or other shapes of the desired size.

*Example 2*

The process of Example 1 is followed except that instead of 58 grams of polyisobutylene, there is substituted a mixture of 56 grams of polyisobutylene and 2 grams of petrolatum. A satisfactory bandage is thus obtained.

*Example 3*

The procedure of Example 1 is followed except that instead of the 58 grams of polyisobutylene, there is substituted a mixture of 55 grams of polyisobutylene and 1 gram of mineral oil, which mineral oil has been preheated to 70–80° C. A satisfactory bandage is thus obtained.

*Example 4*

The procedure of Example 1 is followed except that 42 grams of polyvinylalcohol fine powder is substituted for the 42 grams of the mixture of pectin, gelatin, and sodium carboxymethylcellulose.

*Example 5*

The procedure of Example 1 is followed except that 42 grams of acacia is substituted for the mixture of pectin, gelatin, and sodium carboxymethylcellulose.

*Example 6*

The procedure of Example 1 is followed except that a mixture of 30 grams of acacia and 12 grams of a powdered mixture of gelatin, pectin, and sodium carboxymethylcellulose is employed. This powdered mixture is substituted for the 42 grams of the mixture of pectin, gelatin, and sodium carboxymethylcellulose to yield a satisfactory bandage.

*Example 7*

The procedure of Example 1 is followed except that a mixture of 37 grams of a mixture of pectin, gelatin and carboxymethylcellulose is combined with 5 grams of benzocaine prior to the addition of the polyisobutylene to yield a medicated bandage.

*Example 8*

The procedure set forth in Example 1 is followed except that a mixture of 38 grams of pectin, gelatin, sodium carboxymethylcellulose and 3 grams of amphotericin B and 1 gram of tetracycline base is employed in place of the powdered mixture of gelatin, pectin and carboxymethylcellulose to yield the medicated bandage.

*Example 9*

The procedure set forth in Example 1 is followed except that no polyethylene film is employed and the dough-like bonding composition is applied directly to the surface being treated.

*Example 10*

The procedure set forth in Example 1 is followed except that a mixture of 39 grams of pectin, gelatin, sodium carboxymethylcellulose and 3 grams of insulin is employed in place of the powdered mixture of gelatin, pectin and carboxymethylcellulose to yield the desired medicated bandage.

*Example 11*

The procedure of Example 1 is followed except that 22 grams of sucrose acetate isobutyrate is substituted for the polyisobutylene and 33 grams of a powdered mixture of pectin, gelatin and sodium carboxymethylcellulose is employed. The resultant bonding composition may then be employed directly as bandages or the water insoluble polyethylene film may be applied thereto prior to such use.

*Example 12*

The procedure of Example 1 is followed except that fluorohalocarbon film (Aclar, Allied Chemical) is employed in place of the polyethylene film.

The invention may be embodied within the scope of the appended claims.

What is claimed is:

1. A bandage comprising a water impervious film having secured to one surface thereof an adhesive gum-like bonding composition comprising a blend of a water soluble or swellable hydrocolloid admixed with a water insoluble viscous gum-like elastic binder.

2. The bandage of claim 1 wherein the hydrocolloid is selected from the group consisting of polyvinyl alcohol, powdered pectin, gelatin, carboxymethylcellulose, high molecular weight carbowax, carboxypolymethylene and mixtures thereof.

3. The bandage of claim 1 wherein the viscous gum-like binder is selected from the group consisting of natural rubber, silicone rubber, acrylonitrile rubber, polyurethane rubber, polyisobutylene and sucrose acetate isobutyrate.

4. The bandage of claim 1 wherein the hydrocolloid is selected from the group consisting of polyvinyl alcohol, pectin, gelatin, carboxymethylcellulose, high molecular weight carbowax, carboxypolymethylene and mixtures thereof and the binder is selected from the group consisting of natural rubber, silicone rubber, acrylonitrile rubber, polyurethane rubber, polyisobutylene and sucrose acetate isobutyrate.

5. A bandage as in claim 1 wherein the hydrocolloid is a member of the group consisting of pectin, gelatin, carboxymethylcellulose and mixtures thereof and the binder is polyisobutylene.

6. A bandage as in claim 1 wherein the binder is polyisobutylene.

7. A bandage as in claim 6 containing about 58% by weight of polyisobutylene binder.

8. A bandage for use in the oral cavity comprising a thin polyethylene film backing and adhering to one side thereof an adhesive bonding composition in viscous gum-like elastic form comprising a smooth blend of about 58%, by weight of polyisobutylene and about 42% by weight of a mixture of pectin, gelatin and carboxymethylcellulose.

References Cited

UNITED STATES PATENTS

| 2,835,628 | 5/1958 | Saffir | 167—60 X |
| 3,029,187 | 4/1962 | Steinhardt | 167—60 |
| 3,029,188 | 4/1962 | Cyr et al. | 167—60 |
| 3,249,109 | 5/1966 | Maeth et al. | 128—268 |

RICHARD A. GAUDET, *Primary Examiner.*

L. W. TRAPP, *Assistant Examiner.*